(12) United States Patent
Weinenger

(10) Patent No.: US 10,926,330 B2
(45) Date of Patent: Feb. 23, 2021

(54) STEEL PISTON WITH METALLURGICALLY BONDED BUSHING AND METHOD OF MANUFACTURING

(71) Applicant: Federal-Mogul LLC, Southfield, MI (US)

(72) Inventor: Michael Weinenger, Southfield, MI (US)

(73) Assignee: Tenneco Inc., Lake Forest, IL (US)

( * ) Notice: Subject to any disclaimer, the term of this patent is extended or adjusted under 35 U.S.C. 154(b) by 264 days.

(21) Appl. No.: 15/880,359

(22) Filed: Jan. 25, 2018

(65) Prior Publication Data

US 2018/0236555 A1 Aug. 23, 2018

Related U.S. Application Data

(60) Provisional application No. 62/460,252, filed on Feb. 17, 2017.

(51) Int. Cl.
*B22F 5/00* (2006.01)
*B22F 7/06* (2006.01)
(Continued)

(52) U.S. Cl.
CPC ............ *B22F 5/008* (2013.01); *B22F 3/1055* (2013.01); *B22F 3/11* (2013.01); *B22F 7/062* (2013.01);
(Continued)

(58) Field of Classification Search
CPC ...... B33Y 80/00; B33Y 10/00; B23K 26/346; B23K 26/144; B23K 26/34; B23K 26/082;
(Continued)

(56) References Cited

U.S. PATENT DOCUMENTS 4,666,787 A * 5/1987 Bickle .................. F16C 33/206
428/550
4,941,397 A 7/1990 Kawai et al.
(Continued)

FOREIGN PATENT DOCUMENTS

| EP | 2878840 A1 | 6/2015 |
| WO | 2014165734 A1 | 10/2014 |
| WO | 2016126455 A1 | 8/2016 |

OTHER PUBLICATIONS

International Search Report, dated May 7, 2018 (PCT/US2018/015344).

*Primary Examiner* — Sizo B Vilakazi
(74) *Attorney, Agent, or Firm* — Robert L. Stearns; Dickinson Wright, PLLC

(57) ABSTRACT

A steel piston with a bushing applied to pin bore surfaces by laser cladding or laser additive manufacturing is provided. The bushing is formed of metal, such as bronze, and metallurgically bonded to the steel of the piston. Thus, the bushing cannot fail by rotating relative to pin bore surfaces. The bushing has a porosity ranging from 0.05% to 5%, based on the total volume of the bushing, and a thickness ranging from 0.07 mm to 6 mm. Since the metal is applied directly to the steel by laser cladding or laser additive manufacturing, the overall size of the piston is reduced, compared to typical pistons with a separate steel backed bushing, and the possibility of bushing rotation is avoided. The bushing also provides scuffing resistance and increased unit load capacity of the pin bore.

13 Claims, 1 Drawing Sheet

(51) Int. Cl.
*F02F 3/00* (2006.01)
*F02F 3/10* (2006.01)
*F16J 1/14* (2006.01)
*B23K 26/34* (2014.01)
*B23P 15/10* (2006.01)
*B23K 26/082* (2014.01)
*B23K 26/346* (2014.01)
*B23K 26/144* (2014.01)
*B22F 3/105* (2006.01)
*B22F 3/11* (2006.01)
*B33Y 10/00* (2015.01)
*B33Y 80/00* (2015.01)
*B22F 7/08* (2006.01)
*F02F 3/22* (2006.01)
*B23K 101/00* (2006.01)
*B23K 103/04* (2006.01)
*B23K 103/12* (2006.01)

(52) U.S. Cl.
CPC .............. *B22F 7/08* (2013.01); *B23K 26/082* (2015.10); *B23K 26/144* (2015.10); *B23K 26/34* (2013.01); *B23K 26/346* (2015.10); *B23P 15/10* (2013.01); *B33Y 10/00* (2014.12); *B33Y 80/00* (2014.12); *F02F 3/003* (2013.01); *F02F 3/10* (2013.01); *F16J 1/14* (2013.01); *B22F 2301/10* (2013.01); *B22F 2301/30* (2013.01); *B23K 2101/003* (2018.08); *B23K 2103/04* (2018.08); *B23K 2103/12* (2018.08); *F02F 3/22* (2013.01); *F02F 2003/0061* (2013.01); *F02F 2200/00* (2013.01)

(58) Field of Classification Search
CPC .......... B23K 2103/04; B23K 2101/003; B23K 2103/12; B22F 7/08; B22F 7/062; B22F 5/008; B22F 3/11; B22F 3/1055; B22F 2301/10; B22F 2301/30; F02F 3/10; F02F 3/003; F02F 3/22; F02F 2003/0061; F02F 2200/00; B23P 15/10; F16J 1/14; F16J 1/16; F16J 1/18
See application file for complete search history.

(56) References Cited

U.S. PATENT DOCUMENTS

| | | | |
|---|---|---|---|
| 4,974,498 A | 12/1990 | Lemelson | |
| 5,836,280 A | 11/1998 | Miyazawa | |
| 6,345,599 B1* | 2/2002 | Pfestorf | F02F 3/00 |
| | | | 123/193.4 |
| 6,557,457 B1 | 5/2003 | Hart et al. | |
| 6,923,153 B2 | 8/2005 | Rein et al. | |
| 7,024,981 B2 | 4/2006 | Nigro et al. | |
| 7,536,945 B2 | 5/2009 | Perrone | |
| 7,765,696 B2 | 8/2010 | Maier et al. | |
| 8,181,623 B2 | 5/2012 | Kemnitz et al. | |
| 2005/0276686 A1* | 12/2005 | Bruce | F04D 29/563 |
| | | | 415/160 |
| 2006/0017323 A1* | 1/2006 | Wodrich | B62D 55/14 |
| | | | 305/202 |
| 2006/0110246 A1* | 5/2006 | Bruce | F01D 17/162 |
| | | | 415/160 |
| 2012/0114971 A1* | 5/2012 | Andler | B22F 7/06 |
| | | | 428/647 |
| 2013/0180494 A1 | 7/2013 | Aharonov et al. | |
| 2013/0220115 A1 | 8/2013 | Kantola et al. | |
| 2014/0261283 A1 | 9/2014 | Lineton et al. | |
| 2014/0299091 A1 | 10/2014 | Ribeiro et al. | |
| 2015/0111793 A1 | 4/2015 | Badrak | |
| 2015/0211437 A1 | 7/2015 | Stong et al. | |
| 2015/0219042 A1 | 8/2015 | Inwood et al. | |
| 2017/0037968 A1* | 2/2017 | Roe | F16C 33/124 |

* cited by examiner

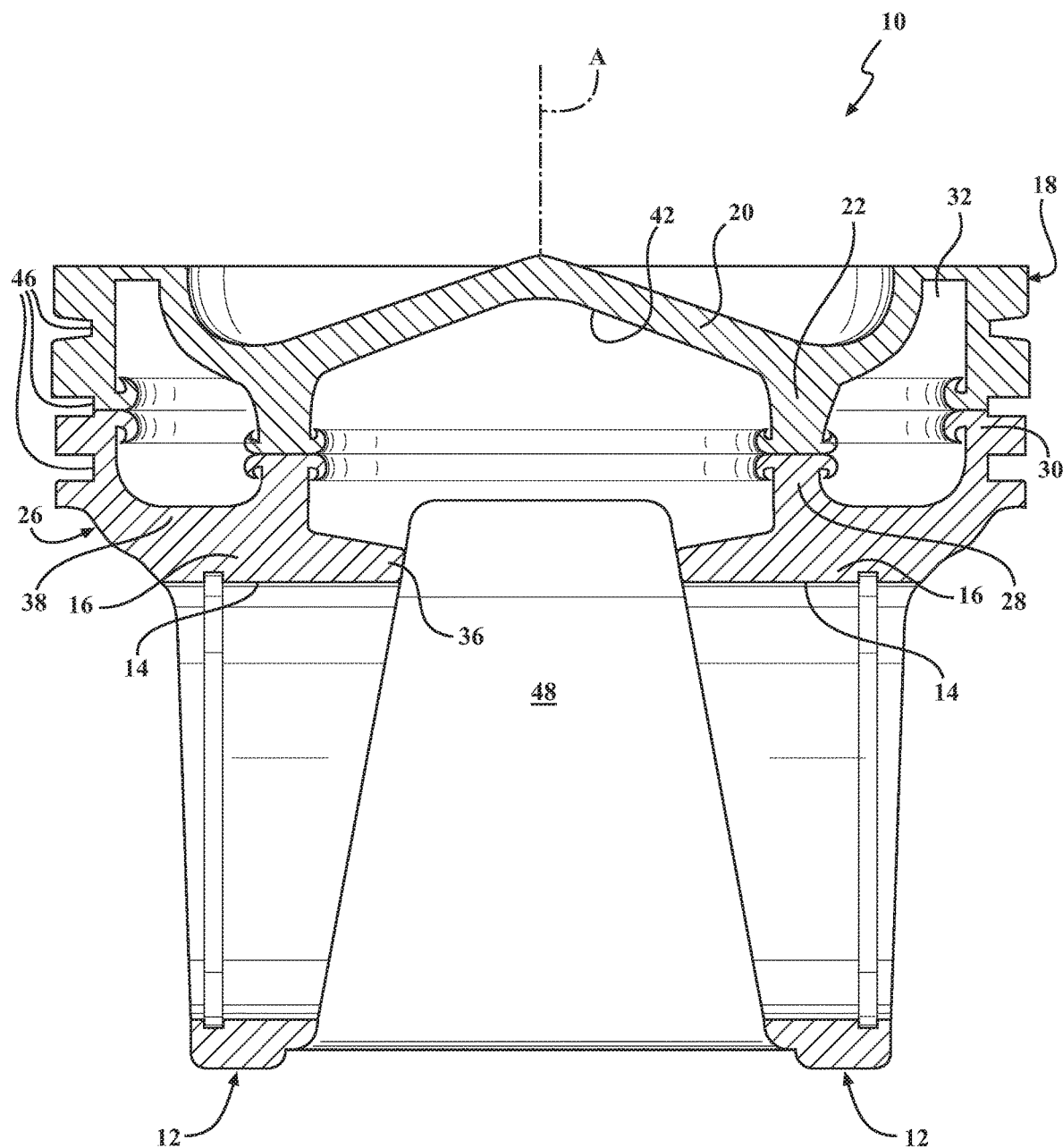

STEEL PISTON WITH METALLURGICALLY BONDED BUSHING AND METHOD OF MANUFACTURING

CROSS REFERENCE TO RELATED APPLICATION

This U.S. utility patent application claims priority to U.S. provisional patent application No. 62/460,252, filed Feb. 17, 2017, the contents of which is incorporated herein by reference in its entirety.

BACKGROUND OF THE INVENTION

1. Technical Field

This invention relates generally to pistons for internal combustion engines, and methods of manufacturing the pistons.

2. Related Art

Pistons for internal combustion engines typically comprise an upper crown portion presenting a combustion surface and a lower crown portion including a pair of pin bosses each defining a pin bore. The pin bore receives a wrist pin, and the wrist pin is received in a small end of a connecting rod which connects the piston to a crankshaft of the engine. The wrist pin is formed separate from the piston and thus is able to slide or float within the pin bore as the connecting rod moves. To reduce the risk of pin bore failure (i.e. scuffing) and increase the load bearing capability of the pin bore, bushings are disposed in the pin bores around the wrist pin. The bushings are formed of a metal material separate from the metal used to form the pin bosses. However, the bushings add weight and size to the piston. The conventional bushings are also typically press fit into the piston and will rotate in one possible failure mode.

SUMMARY OF THE INVENTION

One aspect of the invention provides a method of manufacturing a piston. The method comprises the steps of: providing a body portion including a crown and pin bosses depending from the crown, the pin bosses presenting pin bore surfaces; and applying a bushing to at least one of the pin bore surfaces. The step of applying the bushing includes laser cladding or laser additive manufacturing. The bushing formed by the method provides the benefits of a typical bushing, scuffing resistance, and increased unit load capacity of the pin bore, with reduced size of the pin boss and without the possibility of bushing rotation. The method of applying the metal also provides the bushing with a low porosity, which is a preferred characteristic of piston pin bore bushings.

Another aspect of the invention provides a piston for an internal combustion engine. The piston comprises a body portion including a crown, the body portion including pin bosses depending from the crown, and the pin bosses each presenting a pin bore surface. A bushing is metallurgically bonded to at least one of the pin bore surfaces, and the bushing has a porosity ranging from 0.05% to 5%, based on the total volume of the bushing. The metal is applied directly to the pin bore surface, which reduces the overall size of the pin boss and piston, compared to typical piston pin bosses with a separate steel backed bushing, and eliminates the possibility of bushing rotation. The bushing also provides benefits typical of bushings used in piston pin bores, scuffing resistance, and increased unit load capacity of the pin bore.

BRIEF DESCRIPTION OF THE DRAWING

These and other aspects, features and advantages of the invention will become more readily appreciated when considered in connection with the following detailed description and accompanying drawing, in which:

FIG. 1 is a cross-sectional side view of a steel piston including bronze bushings metallurgically bonded to the steel of pin bore surfaces according to an example embodiment.

DETAILED DESCRIPTION OF EXEMPLARY EMBODIMENTS

One aspect of the invention provides a piston 10, for example a steel piston 10, designed with a metal bushing 12 applied directly to at least one pin bore surface 14 of a pin boss 16 by an additive, manufacturing, or deposition process, such as laser cladding or laser additive manufacturing, and thus the bushing 12 is metallurgically bonded to the steel of the pin bore surface 14. Since the metal used to form the bushing 12 is applied directly to the steel of the pin bore surface 14, the thickness and size of the pin boss 16, and the overall size of the piston 10, is reduced compared to a typically piston pin boss with a separate steel backed bushing, and the possibility of bushing rotation is eliminated. The bushing 12 provides benefits typical of bushings used in piston pin bores. The bushing 12 also provides scuffing resistance, and increased unit load capacity of the pin bore. Due to the advantages provided by the metallurgically bonded bushing 12, there is no need for a conventional bushing which could rotate along or relative to the pin bore surface 14 during failure and add weight and size to the piston 10.

As shown in the example embodiment of FIG. 1, the piston 10 extends along a central axis A along which the piston 10 reciprocates within a cylinder bore (not shown). The piston 10 includes an upper crown portion 18 having dome or an upper combustion wall 20, represented here, by way of example and without limitation, as having a recessed combustion bowl, against which combustion forces directly act in the cylinder bore. The upper crown portion 18 has at least one, and shown here, by way of example and without limitation, as having a pair of annular upper ribs, referred to hereafter as an upper inner rib 22 and upper outer rib 24, depending from the upper combustion wall 20 to respective free ends. The piston 10 further includes a lower crown portion 26 having at least one, and shown here, by way of example and without limitation, as having a pair of annular lower ribs, referred to hereafter as a lower inner rib 28 and lower outer rib 30, extending to respective free ends arranged in alignment for fixed abutment with the respective free ends of the upper inner and outer ribs 22, 24 to form and separate an outer cooling gallery 32 from a central region of the piston 10. The outer cooling gallery 32 presents an oil passage extending circumferentially around the upper crown portion 18. As shown in FIG. 1, the outer ribs 24, 30 of the piston 10 typically include a plurality of ring grooves 46 for receiving piston rings (not shown).

Further, the lower crown portion 26 has an outer gallery floor 38 extending laterally between the lower inner and outer lower ribs 28, 30. The lower inner rib 28, the lower outer rib 30, the upper inner rib 22, the upper outer rib 24, the upper combustion wall 20, and the outer gallery floor 38 define the outer cooling gallery 32.

According to certain embodiments, the outer gallery floor 38 has a through opening providing an oil inlet (not shown) to allow oil to flow into the outer gallery 32 and a through opening providing an oil outlet (not shown) to allow oil to flow outwardly from the outer gallery 32. As such, oil from the engine crankcase is able to flow upwardly into the outer cooling gallery 32 through the oil inlet, whereupon the oil is circulated about the outer cooling gallery 32 and then exits through the oil outlet.

Upon joining or attaching the upper crown portion 18 to the lower crown portion 26, and the annular outer oil gallery 32 is formed. The outer oil gallery 32 is substantially closed or sealed upon joining the upper crown portion 18 to the lower crown portion 26, except for the oil inlet, oil outlet, and any other passage or small opening for conveying of cooling oil.

The piston 10 can have another design, different from the design shown in FIG. 1. For example, the piston 10 could be constructed as a monolithic piece of material, such as by being formed in a single steel casting or 3D printing process. Further, rather than having a "single gallery" construction, the piston 10 could have a "dual cooling gallery" with a substantially enclosed central region. Alternatively, the piston 10 could be galleryless, and thus formed without any cooling galleries, such that an undercrown surface 42 is left open for exposure to cooling oil.

The piston 10 includes a pair of the pin bosses 16 depending generally from the outer floor 36. Each pin boss 16 includes the pin bore surface 14 defining a pin bore with a pin bore axis for receipt of a wrist pin (not shown). In the example embodiment, the pin bore surfaces 14 provide a circular shape and are desired to surround the entire wrist pin circumference. In other words, the pin bore surfaces 14 present a circumference extending completely around the pin bore axis. However, the pin bosses 16 could have a different design. For example, the pin bosses 16 could be in the form of a saddle, such that the much of the pin bore surface 14 provides only half or less than the entire circular shape. In other words, the pin bore surface 14 extends not more than half way around the pin bore axis. A space 48 is left between the pin bosses 16 for receipt of a small end of a connecting rod (not shown).

In the example embodiment, the bushings 12 are applied directly to each pin bore surface 14 and are metallurgically bonded to the steel of the pin bore surfaces 14. Thus, the bushings 12 will not rotate in the pin bore, like is possible with typical pin bore bushings which can fail by rotating. The metal used to form the bushings 12 is preferably a mixture of copper and tin, such as bronze, but other metals could be used. According to the example embodiment, the bushings 12 are formed of bronze, including a weight percent (wt. %) of copper and a wt. % of tin. Each bushing 12 can be applied as a single layer of the metal, or multiple layers of the metal. Typically, the thickness of one bushing 12 ranges from 0.07 mm to 6 mm. The bushings 12 typically have a very low porosity, such as a porosity ranging from 0.05% to 5%, based on the total volume of the bushing 12, which is desirable for pin bore bushings. Each bushing 12 can be applied to the entire associated pin bore surface 14 or a portion of the associated pin bore surface 14.

Another aspect of the invention provides a method of manufacturing the steel piston 10 with the metallurgically bonded bushing 12 applied directly to at least one of the pin bore surfaces 14 of the pin bosses 16. According to the example embodiment, the method includes forming the upper crown portion 18 and the lower crown portion 26 separate from one another, for example by casting or forging. The upper crown portion 18 and the lower crown portion 26 are both formed of steel, which can be the same type of steel or different types of steel.

The method next includes joining the upper crown portion 18 and the lower crown portion 26, for example by friction welding, hybrid induction welding, or another joining process, to form the piston 10. The joining step includes forming the outer cooling gallery 32 between the lower inner rib 28, the lower outer rib 30, the upper inner rib 22, the upper outer rib 24, the upper combustion wall 20, and the outer gallery floor 38.

The method further includes forming the bushing 12 by applying the metal, such as bronze, to at least one of the pin bore surfaces 14 of the pin bosses 16. This step includes applying the metal directly to the steel of the pin bore surface 14, so that the metal, such as the bronze, metallurgically bonds to the steel of the pin bore surface 14. The metal can be applied around the entire circumference of the pin bore surface 14, or along only a portion of the pin bore surface. For example, instead of coating the entire pin bore surface 14, one option is to coat only the upper half of the pin bore surface 14, which is the portion that bears high loads, and leave the lower surface uncoated. This would save on material and time needed to coat the pin bore surfaces 14.

The step of applying the bushing 12 includes an additive manufacturing, or deposition process. According to the example embodiment, the bushing 12 is formed by laser cladding or laser additive manufacturing. The example laser cladding process includes applying the metal in a controlled manner. Typically, a stream of the metal in the form of powder is fed into a laser beam as the laser beam is scanned across the pin bore surfaces 14. The powder is deposited on the pin bore surfaces 14 and forms the bushings 12. The step of applying the metal to the pin bore surfaces 14 to form the bushings 12 can include applying a single layer or multiple layers of the metal. The thickness of each bushing 12 ranges from 0.07 mm to 6 mm. The laser cladding or other process used to form the bushings 12 typically provides the bushings 12 with a porosity ranging from 0.05% to 5%, which is desirable for pin bore bushings.

The laser cladding process has several advantages. For example, the metal can be selectively applied and placed precisely in desired locations on the pin bore surfaces 14. The metal used to form the bushings 12 is also metallurgically bonded or fused to the steel of the pin bore surfaces 14 with little or no porosity. In addition, various different metals can be applied using the laser cladding process. The laser cladding process also requires little heat. Thus, distortion of the steel material is avoided, along with the need for additional machining to correct distortion. However, the method can also include additional steps typically used to form pistons, such as machining to form the desired shape of the piston 10.

The bushing 12, typically formed of bronze, can be applied to other metal products which would benefit from the bushing 12, besides the piston 10 described above. In each case, the bushing 12 is applied directly to another metal material, typically steel, by one of the processes describe above and thus the bushing 12 is metallurgically bonded to the metal material.

Obviously, many modifications and variations of the present invention are possible in light of the above teachings and may be practiced otherwise than as specifically described while within the scope of the following claims. In particular, all features of all claims and of all embodiments can be combined with each other, as long as they do not contradict each other.

The invention claimed is:

1. A piston for an internal combustion engine, comprising:
a body portion including a crown,
said body portion including pin bosses depending from said crown, said pin bosses each presenting a pin bore surface,
a bushing metallurgically bonded to at least one of said pin bore surfaces, and
said bushing having a porosity ranging from 0.05% to 5%, based on the total volume of said bushing.

2. The piston of claim 1, wherein said body portion is formed of steel and said bushing is formed of copper and tin.

3. The piston of claim 1, wherein said at least one bushing has a thickness ranging from 0.07 mm to 6 mm.

4. The piston of claim 1, wherein said bushing is applied to said body portion by laser cladding or laser additive manufacturing.

5. The piston of claim 1, wherein said body portion is galleryless and thus formed without any cooling galleries, such that an undercrown surface of said crown is exposed.

6. The piston of claim 1, wherein each pin bore surface presents a circumference extending completely around a pin bore axis.

7. The piston of claim 6, wherein said bushing is disposed only on an upper half of said pin bore surface.

8. The piston of claim 1, wherein said bushing cannot rotate relative to said pin bore surfaces, and said body portion is free of a conventional bushing capable of rotating relative to said pin bore surfaces.

9. The piston of claim 1, wherein said bushing is formed of multiple layers of a bronze material, said bronze material including copper and tin.

10. The piston of claim 1, wherein said body portion is formed of steel,
said bushing includes copper and tin,
said bushing has a porosity ranging from 0.05% to 5%,
said crown includes an upper crown portion including an upper inner rib and an upper outer rib each extending annularly around a central axis and depending from an upper combustion wall of said upper crown portion to respective ends,
said crown includes a lower crown portion having a lower inner rib and a lower outer rib each extending to respective ends arranged in alignment and in fixed abutment with the respective free ends of said upper inner and outer ribs, and
said body portion includes an outer cooling gallery presenting an oil passage extending circumferentially around said upper crown portion, and
said lower inner rib, said lower outer rib, said upper inner rib, said upper outer rib, said upper combustion wall, and said outer gallery floor define said outer cooling gallery.

11. The piston of claim 1, wherein said bushing is applied to said body portion by laser cladding or laser additive manufacturing,
said body portion extends along a central axis,
said crown includes an upper crown portion presenting an upper combustion wall,
said upper combustion wall includes an uppermost surface presenting a recessed combustion bowl,
said upper crown portion includes an upper inner rib and upper outer rib each extending annularly around said central axis and depending from said upper combustion wall to respective ends,
said crown includes a lower crown portion having a lower inner rib and a lower outer rib each extending to respective ends arranged in alignment and in fixed abutment with the respective free ends of said upper inner and outer ribs,
said body portion includes an outer cooling gallery presenting an oil passage extending circumferentially around said upper crown portion,
said outer cooling gallery surrounds a central cooling gallery located at and around said central axis,
said outer ribs include a plurality of ring grooves,
said lower crown portion includes an outer gallery floor extending laterally between said lower inner rib and said lower outer rib,
said lower inner rib, said lower outer rib, said upper inner rib, said upper outer rib, said upper combustion wall, and said outer gallery floor define said outer cooling gallery,
said outer oil gallery is sealed except for an optional passage for conveying of cooling oil,
said pin bosses depend from said outer floor of said crown and are spaced from one another,
each pin boss includes one of said pin bore surfaces defining a pin bore for receipt of a wrist pin,
each pin bore surface has a circular shape,
said bushing cannot rotate relative to said pin bore surfaces,
said bushing is formed of multiple layers of a bronze material, said bronze material including said copper and tin, and
said bushing has a thickness ranging from 0.07 mm to 6 mm.

12. A piston for an internal combustion engine, comprising:
a body portion including a crown,
said body portion including pin bosses depending from said crown, said pin bosses each presenting a pin bore surface,
a bushing metallurgically bonded to at least one of said pin bore surfaces, and
said bushing being applied to said body portion by laser cladding or laser additive manufacturing.

13. The piston of claim 1, wherein said bushing has a thickness extending from said pin bore surface to an outer surface of said bushing, said outer surface of said bushing is exposed, and the entire thickness of said bushing has said porosity ranging from 0.05% to 5%, based on the total volume of said bushing.

* * * * *